Oct. 18, 1949.                W. J. URBAN                2,485,422
                        SINTERING MACHINE DEAD PLATE
Filed March 6, 1947                              3 Sheets-Sheet 1
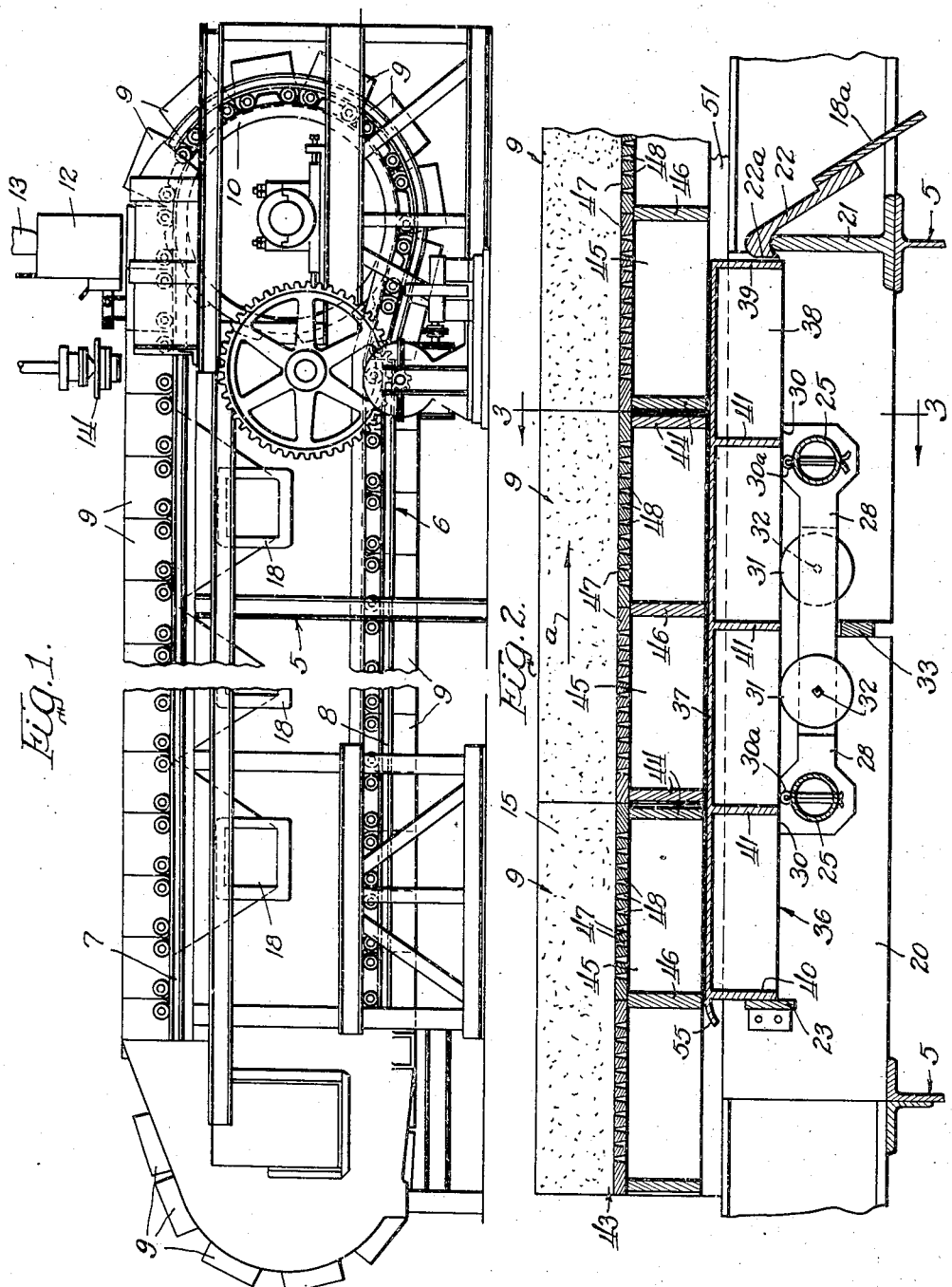
Inventor.
William J. Urban.
By Brown, Jackson, Bottcher & Dienner.
Attys

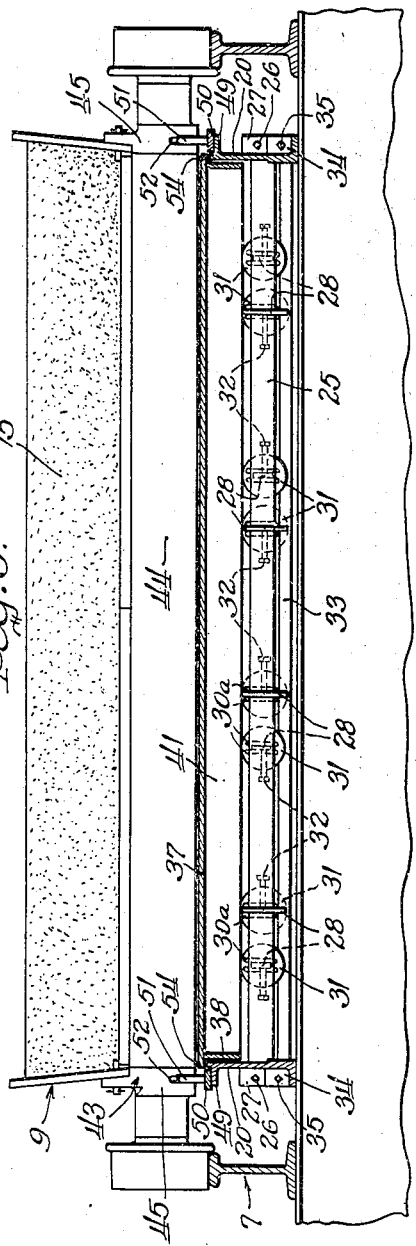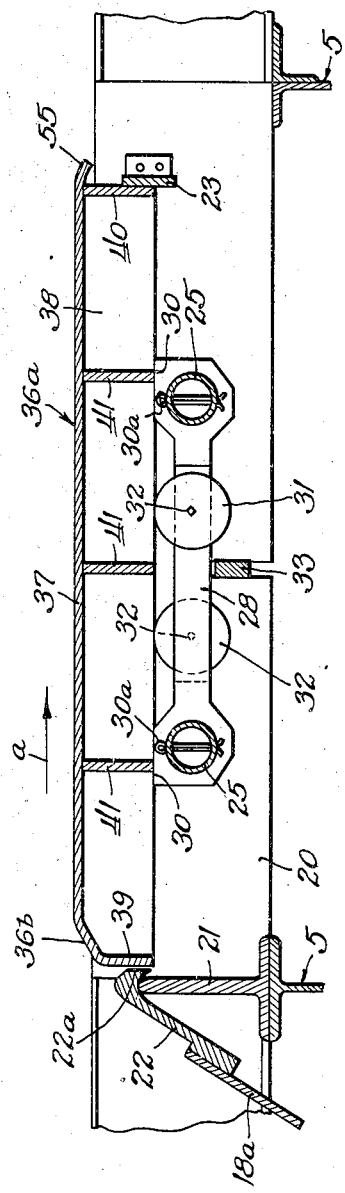

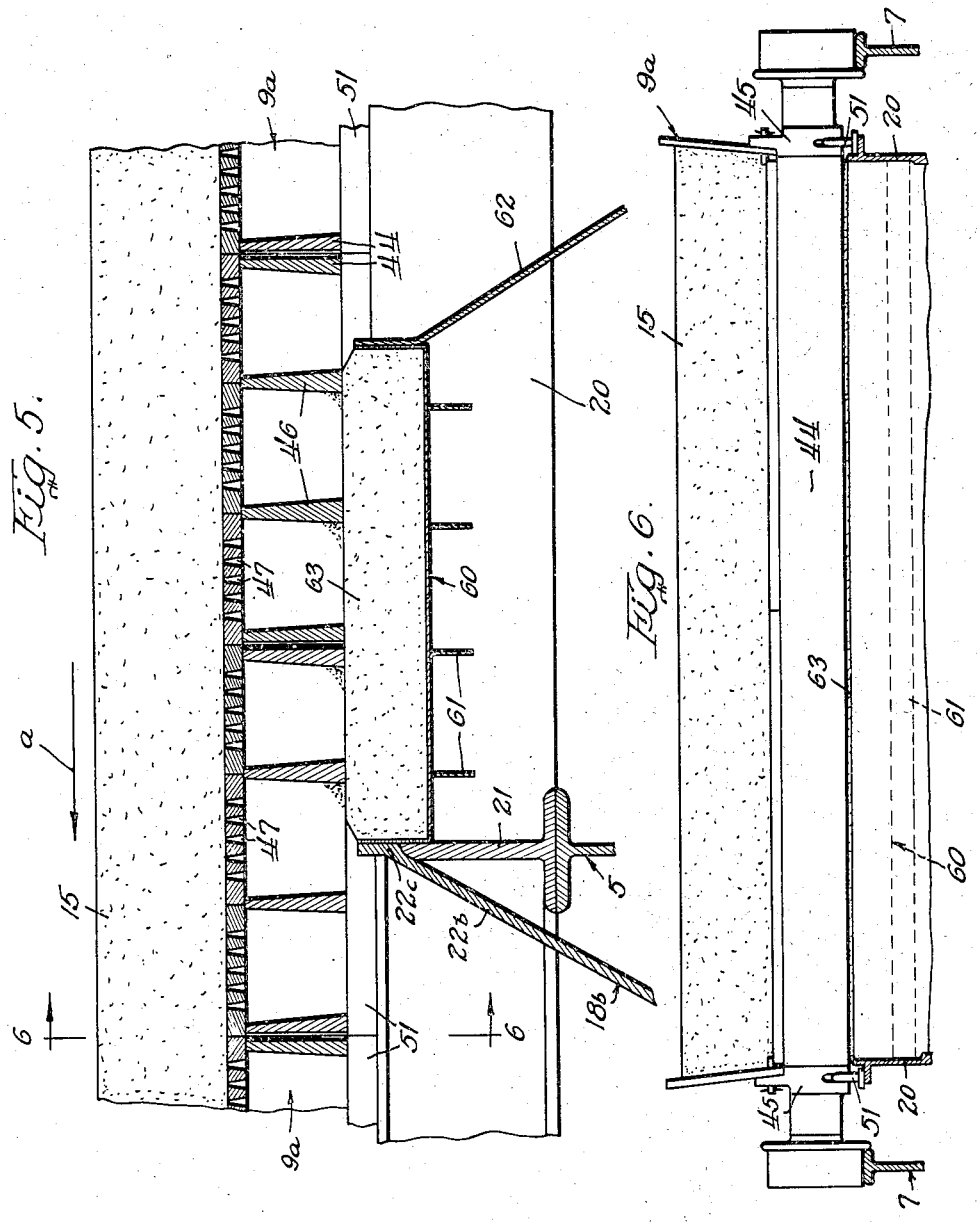

Patented Oct. 18, 1949

2,485,422

UNITED STATES PATENT OFFICE 2,485,422

SINTERING MACHINE DEAD PLATE

William J. Urban, Glen Ellyn, Ill., assignor to American Ore Reclamation Company, Chicago, Ill., a corporation of New York Application March 6, 1947, Serial No. 732,720

5 Claims. (Cl. 266—21)

This invention relates to sintering machines, and has to do with dead plates therefor.

It is known, in sintering machines, to deliver the material to be sintered onto the grates of pallets travelling along a track, and to ignite the bed of material at the top thereof and pass the pallets over a wind box for causing down draft combustion of the material. In such machines, it is of importance that air leakage beneath the pallets to the wind boxes be kept as low as possible, in order that the maximum amount of air be drawn downward through the material, in the passage of the pallets over the wind boxes, in order that combustion may proceed expeditiously and be completed throughout the full depth of the bed of material before the pallets pass from above the wind boxes, at the delivery end of the machine. The greatest air leakage is apt to occur at the ends of the wind box assembly, beneath pallets approaching or leaving the wind boxes. With a view to reducing air leakage at those areas, it is the usual practice, in known sintering machines, to provide dead plates at the ends of the wind boxes, suitably disposed and of appropriate area to underlie the bottom opening of the frames of pallets passing thereover. The dead plates presently provided are fixed to the frame of the machine. It is necessary that these dead plates be disposed a substantial distance below the pallets, to assure that the pallets will not strike the dead plates. That is essential, because if a pallet struck a dead plate, the pallets travelling along the track in endwise contact would be stopped abruptly and there would be serious danger of wrecking the machine. Due to the necessity of having the dead plates a substantial distance below the bottoms of the pallets, serious air leakage beneath the pallets over the dead plates occurs, and it is necessary to operate the machine at sufficiently low speed to compensate for such air leakage in order to assure that the material is sintered for the full depth of the bed before the pallets pass beyond the wind boxes. That objection to the dead plates presently used and the accompanying air leakage has long been recognized, but has been accepted as an unavoidable evil.

My invention is directed to the provision of dead plates at the ends of the wind box assembly whereby the space between the dead plates and the bottoms of the pallets may be greatly reduced, compared to the sintering machines presently used above referred to, or may be completely eleminated, whereby objectionable air leakage between the dead plates and the pallets is obviated. The dead plate of my invention is of such character that it is automatically maintained at a proper height to provide an effective seal for the bottoms of the pallets passing thereover. More particularly, in one form of my invention, I provide vertically movable dead plates yieldingly urged upward into close proximity to, or even in contact with, the bottoms of the pallets passing over the dead plates, whereby the dead plates provide substantially airtight closures for the bottoms of the pallets. Since the dead plates are vertically movable, as noted, and the materials treated in sintering machines are frequently highly abrasive in character, it is desirable that contacting movable surfaces associated with the dead plates and the means for raising them be shielded from the material being sintered. To that end, I provide means for urging the dead plates upward, disposed beneath the latter, so as to be shielded thereby from the material being sintered, and also so construct and arrange the dead plate that it serves to shield from the material being sintered surfaces with which the dead plate has rubbing contact. I also provide means, supplementary to the dead plates, further guarding against air leakage beneath the pallets as they enter the wind box assembly. In a second form of my invention, I provide a stationary dead plate of box form which is maintained filled with a granular material to a height effective for sealing the bottoms of pallets passing thereover. Conveniently, the granular filling of the dead plate may be replenished by fines sifting through the pallet grates, thereby automatically maintaining the filling at an effective height assuring the desired sealing of the bottoms of the pallets. Further objects and advantages of my invention will appear from the detail description.

In the drawings:

Figure 1 is a more or less diagrammatic side view of a sintering machine embodying my invention;

Figure 2 is a fragmentary lengthwise sectional view, on an enlarged scale, of the feed end of the sintering machine taken through the dead plate and associated parts, showing loaded pallets travelling over the dead plate;

Figure 3 is a sectional view taken substantially on line 3—3 of Figure 2;

Figure 4 is a view like Figure 2, but taken at the delivery end of the machine, the pallets being omitted;

Figure 5 is a view similar to Figure 2, but showing a modified form of dead plate; and Figure 6 is a sectional view taken substantially on line 6—6 of Figure 5.

I have illustrated my invention as applied to a continuous sintering machine of the Dwight & Lloyd type, by way of example, for which it is particularly well adapted, though, in its broader aspects it may be used with other types of sintering machines having a charging or feed station and a delivery station, with a windbox assembly therebetween. The sintering machine shown is similar to that disclosed in Patent No. 1,764,695, issued June 17, 1930, to Edward W. Shallock. It comprises a suitably constructed main frame 5 carrying an endless track 6 having an upper run 7 and a lower run 8 connected by return bends at the feed and the delivery ends of the track. Wheeled pallets 9 travel upon the track 6 and, at the feed end return bend, are raised by suitably driven sprocket wheels 10, from the lower run to the upper run, along which they are propelled, by the sprocket wheels, in endwise contact, in the direction indicated by the arrow $a$.

The pallets 9 on the upper run 7 of track 6 first pass beneath a charging hopper 12 to which the material, for example ore, to be sintered is delivered by a spout 13. The pallets passing beneath the hopper 12 provide a continuous travelling grate onto which the ore is delivered from hopper 12 in a thick layer or bed 15, thus charging the pallets. From the hopper 12 the pallets pass beneath an ignition device or furnace 14 which ignites the bed 15 of ore at the upper face thereof. The ignition device 14 is disposed at the feed end of a wind box assembly comprising a series of wind boxes 18 secured together at their ends and connected to suitable suction means for inducing air downward therethrough, as is known. The charged pallets pass over the wind box assembly, by which the bed of ore is subjected to down draft, whereby combustion is propagated downwardly therethrough. From the wind box assembly the pallets pass to and around the discharge or delivery end of the machine, where the sintered material is broken off and discharged from the pallets which then pass about that bend to the lower run of the track. The machine so far described is of known construction and operation, as previously noted.

In the known sintering machines presently used, above referred to, a dead plate is fixedly mounted at each end of the wind box assembly, for reducing air leakage beneath the pallets into the end boxes of that assembly. But air in large amounts leaks beneath the pallets, between the bottoms thereof and the dead plates, due to the necessity, above referred to, of having ample clearance between the dead plates and the bottoms of the pallets to assure that the latter will not strike the dead plates in their travel. I have discovered that this objectionable air leakage can be eliminated by providing dead plates positioned in close proximity to, or even in contact with, the bottoms of pallets passing thereover.

In the form of my invention shown in Figures 1 to 4, inclusive, I provide, at each end of the wind box assembly, two channel frame members 20 suitably mounted on main frame 5 of the machine, disposed inward an appropriate distance from the respective rails of the upper run 7 of track 6. The channels of the members 20 are directed outward and these members 20 extend toward the feed end of the machine from a cross member 21, to the top of which is secured an end wall plate 22 of the wind box 18$a$ at the feed end of the wind box assembly 18. The end plate member 22 may be formed integrally with the cross member 21 and is provided at its outer or feed end with a flat vertical surface 22$a$. A cross bar 23, which constitutes stop means, as will appear more fully presently, is suitably secured to and extends between the frame members 20 an appropriate distance outward from the feed end 22$a$ of plate 22. It will be clear, from what has been said, that the frame members 20 and the cross bar 23 and the plate 22 constitute a rectangular open top frame at the feed end of the wind box assembly 18.

Two cylindrical tubular pivot rods 25 extend between the frame members 20, with their end portions secured, conveniently by screws 26, in collars 27 welded or otherwise suitably secured to the outer faces of the members 20. Four levers 28 are mounted for turning movement on each of the rods 25, with their longer arms extending therefrom toward the other rod 25. The levers 28 are restrained against movement lengthwise of the rods 25 by stop members, conveniently cotter pins 30$a$, secured through rods 25 adjacent the sides of the respective levers. The shorter arm of each of the levers 28 is of generally rectangular shape and is flat at its upper edge, at 30. A slotted weight 31 is adjustably secured on the longer arm of each lever, conveniently by means of a set screw 32. A stop bar 33 underlies the longer arms of the levers 28, this bar having its end portions extending into vertical slots in boss members 34 welded or otherwise suitably secured to the outer faces of the frame members 20, the boss members 34 receiving set screws 35 effective for securing bar 33 in vertical adjustment.

A dead plate 36 is slidably mounted for vertical movement in the frame defined by the members 20, 22, and 23, previously referred to. The dead plate 36 comprises a top plate 37 to which are secured depending side flanges 38 and end flanges 39 and 40 of substantial height. Reinforcing ribs 41 extend between the side flanges 38, to which and the top plate 37 they are secured, conveniently by welding. The flanges 38 and 39, and the ribs 41, together constitute the body of dead plate 36, which body fits loosely in the frame defined by the members 20, 21 and 23, whereby the dead plate 36 may be removed from and replaced in that frame, from above, with expedition and facility, as will be clear from what has been said above. Two of the ribs 41 are disposed to rest upon the upper edges 30 of the shorter arms of the levers 28, one upon the lever on one of the rods 25 and the other upon the other levers, a short distance beyond the axis of the rod 25. It will be seen that the weighted levers 28 are effective for urging the dead plate 36 upward, and that by proper adjustment of the weights 31 the levers 28 may be balanced against the dead plate so as to hold the latter at a desired level. Alternatively, the weights 31 may be so adjusted that the levers overbalance the dead plate, the stop bar 33 then functioning to limit movement of the levers 28, thereby limiting the height to which the dead plate 36 is raised.

The pallets 9 are of known construction, and a brief description thereof will suffice. Each of the pallets has a rectangular frame 43 comprising side and end frame members 44 and 45, respectively, and suitably disposed reinforcing elements or ribs 46. Each of the pallets 9 carries grate bars 47 suitably mounted therein, together constituting the pallet grate. When the pallets are propelled along the upper run of the track in endwise contact, the pallet grates constitute a continuous travelling grate for reception of the ore or other material to be sintered, as above noted. The grate bars 47 are provided with suitable openings 48 therethrough to permit of air being drawn downward through the bed of material being sintered, for propagation of combustion downward through the bed in the travel of the pallets over the wind box assembly.

The dead plate 36 normally is held at such a height that the underface or the bottom of the pallets passing thereover are in close proximity to the upper face of top plate 37, or in contact therewith. In that connection, it will be understood that the underface or bottom of the respective pallets is machined off so that the bottoms of the elements thereof are disposed in a common plane. It will also be understood, of course, that the width of top plate 37 of dead plate 36 is somewhat greater than that of the bottom opening of the pallet, and that the length of plate 37 preferably is several times that of a pallet. As will be clear from Figures 2 and 3, the bottoms of the pallets passing over dead plate 36 are in close proximity to the upper face of top plate 37, or may even be in actual contact therewith, so that the dead plate substantially closes the bottoms of the pallets, providing therewith a substantially airtight closure preventing air leakage beneath the pallets approaching the wind box assembly.

Each of the frame members 20 is provided, adjacent its top, with an outwardly extending flange 49, on which is mounted a seal strip 50. Seal bars 51, loosely mounted in a known manner in downwardly opening grooves 52 in side members 45 of frames 43 of the respective pallets, rest upon the strip 50, providing therewith substantially airtight closures at the sides of the pallets. The seal strips 50 and the seal bars 51 are known, and the strips 50 extend the full length of the wind box assembly providing, in cooperation with seal bars 51, means preventing excessive air leakage beneath the pallets at the sides thereof during their travel over the wind box assembly. By disposing the dead plate 36 in the manner stated, this dead plate effectively cooperates with the pallets and the seal strips and seal bars at the sides thereof to prevent air leakage, to any appreciable or objectionable extent, beneath the pallets, either from the sides or ends thereof, in the travel of the pallets over the dead plate to the wind box assembly.

It will be understood, from what has been said, that the dead plate 36 is floatingly mounted for vertical movement in its frame comprising the members 20, 22, and 23, and is restrained thereby against movement both transversely and lengthwise. Since the material being sintered frequently is highly abrasive in character, it is important that the contacting moving parts of the dead plate assembly be shielded against such materials. To that end, top plate 37 of the dead plate 36 is extended at each side a short distance beyond the side flange 38, so as to overlie the upper edge of the adjacent frame member 20, providing a top closure for the space between the outer face of flange 38 and the inner face of the web of member 20. This outwardly projecting element 54 thus guards against abrasive particles entering between flange 38 and frame member 20, guarding these parts against objectionable wear from that cause, in the vertical movement of the dead plate 36. The top plate 37 is extended at its outer end and curved downward, at 55, thereby providing an element overlying the stop bar 23 and guarding against entry of abrasive materials between this bar and the outer face of flange 40 of the dead plate 36. As will be understood, the element 55 also provides an inclined surface which, in the event the dead plate 36 should be raised to a level slightly above that of the pallets, will be contacted by the pallet bottoms so as to be depressed thereby, the top plate 37 of dead plate 36 thereafter being in contact with the bottoms of he pallets passing thereover. That guards against injury to either the pallets or the dead plate, or any other parts of the machine, if the dead plate should at any time be raised sufficiently to be contacted by a pallet. It will be noted that the levers on each of the pivot rods 25 are symmetrically disposed with respect to the levers on the other rod, and are all independently movable, so that the upward pressure exerted by the levers on the dead plate 36 is uniformly distributed and there is no risk of tilting or cocking of the dead plate with resultant binding thereof in its frame. It will also be noted that the levers are disposed in underlying relation to the dead plate, so that the areas of contact between the levers and the ribs 41 of the dead plate are effectively shielded by top plate 37 against abrasive particles which may pass through the grates of the pallets.

So far I have described the dead plate at the feed end of the machine. I provide, also, a dead plate 36a at the delivery end of the wind box assembly. This dead plate 36a is the same as dead plate 36, except that its end adjacent the wind box assembly is inclined or beveled at 36b so that if this dead plate is contacted by a pallet it will be depressed, in the same manner as dead plate 36, without causing damage to either the dead plate or the pallet or any part of the machine. The construction and operation of the dead plate means at the delivery end of the machine is otherwise the same as that of the means at the feed end, and requires no further explanation here. While I have shown lever means for urging the dead plate upward, it is to be understood that the dead plate may be yieldingly urged upward in any suitable manner, within the broader aspects of my invention, though the lever means, arranged and operating as shown, is preferred.

In the modification of Figures 5 and 6, I have shown a stationary dead plate 60 suitably mounted on and extending between the frame members 20. This dead plate 60 is of box formation, open at its top and provided at its bottom with transverse reinforcing ribs 61 welded or otherwise suitably secured thereto. The inner end wall of dead plate 60 is disposed in close proximity to, or in contact with, the flat outer face of a vertical thickened element 22c at the top of outer end wall 22b of windbox 18b. A spillage chute 62 extends downward and outward from the outer end of dead plate 60, for reception of fines passing through the pallet grates 47, as is known.

The dead plate 60 is disposed with its upper edge spaced a short distance below the bottoms of the pallets 9 passing thereover. In Figures 5 and 6 the space between the upper edge of the dead plate 60 and the bottoms of the pallets has been exaggerated somewhat, for clearness of illustration. As noted, the dead plate 60 is of box form, and it is filled with a body of granular material 63, which may be sand, fines of the material being sintered, or any suitable material. In the passage of the charged pallets over dead plate 60, the fines sifting through the pallet grates drop upon the granular body 63 and tend to build it up to a height extending above the bottoms of the pallets. The excess in fines is leveled off by the end frame members 44 and the ribs 46 of the pallets 9a, so that the bottoms of the pallets are in contact with the upper surface of the granular body 63, which thus provides an effective seal between the dead plate 60 and the pallets 9a. I thus utilize the fines sifting through the pallet grates to replenish the granular material of body 63 and automatically maintain the seal, as and for the purposes stated. Since the granular material of the body 63 may readily be displaced by the pallets, as stated, the dead plate 60, comprising the body 63 of granular material, has yielding contact with the pallets, as well as sealing contact therewith, and risk of damage to the machine by contact of the pallets with the dead plate is eliminated.

In Figures 5 and 6 I have shown a dead plate at the feed end of the machine. It will be understood that a similar dead plate is provided at the delivery end and, if desired, a spillage chute. Also, in the form of my invention shown in Figures 1 to 4, inclusive, suitably disposed spillage chutes may be provided, as is known.

The known stationary dead plates presently used, previously referred, of necessity are spaced a substantial distance below the bottoms of the pallets. The fines sifting through the pallet grates will drop upon those dead plates but will not accumulate thereon to sufficient depth to provide a seal. That is due to the fact that the fines include particles of relatively large size as well as particles of small size. As the pallets travel over the dead plates, they pick up the large size particles and move them over the dead plates to the ends thereof. The large particles of fines moving over the dead plate pick up the small particles of fines, which are also moved over and discharged from the dead plates. The referred to action is evidenced by scoring of the dead plates, and of the underfaces of the pallets, by the larger particles of fines. The net result is that the fines do not accumulate on the dead plates to an appreciable depth, and there is a clear space between the dead plate and the pallets passing thereover, clearly discernible by looking under the pallets toward the wind boxes.

In the dead plate 60 of Figures 5 and 6, the body 63 of granular material provides a bed of substantial depth. The larger particles of fines deposited on that bed are pushed downward and buried therein, by the pallets, and are covered by a layer of finer particles. That renders it possible to maintain the upper surface of the granular body 63 at such a height as to assure an effective seal thereof with the bottoms of the pallets, as has been explained above.

It will be understood that changes in detail may be resorted to without departing from the field and scope of my invention, and I intend to include all such variations, as fall within the scope of the appended claims, in this application in which the preferred forms only of my invention have been disclosed.

I claim:

1. In a sintering machine comprising a track having a feed end and a delivery end with a wind box assembly therebetween, a train of pallets travelling along said track in endwise contact from the feed end thereof over said wind box assembly to the delivery end, a dead plate at one end of said wind box assembly, and weighted levers underlying said dead plate, the latter resting on said levers and otherwise free therefrom, said levers urging said dead plate upward into close proximity to the bottoms of pallets passing thereover providing a substantially airtight closure therefor.

2. In a sintering machine comprising a track having a feed end and a delivery end with a wind box assembly therebetween, a train of pallets travelling along said track in endwise contact from the feed end thereof over said wind box assembly to the delivery end, a dead plate at one end of said wind box assembly, weighted levers underlying said dead plate with the latter resting on said levers and urged thereby upward into close proximity to the bottoms of pallets passing thereover providing a substantially airtight closure therefor, and means limiting movement of said levers in dead plate raising direction.

3. In a sintering machine comprising a track having a feed end and a delivery end with a wind box assembly therebetween, a train of pallets travelling along said track in endwise contact from the feed end thereof over said wind box assembly to the delivery end, frame members defining an open top rectangular frame at one end of said wind box assembly, a dead plate comprising a body substantially conforming to and fitting loosely in said frame, pivot rods mounted on said frame members extending therebetween underlying said dead plate, and weighted levers independently pivoted on said rods, said dead plate resting on said levers and otherwise free therefrom, said levers urging said dead plate upward into close proximity to the bottoms of pallets passing thereover providing a substantially airtight closure therefor.

4. In a sintering machine comprising a track having a feed end and a delivery end with a wind box assembly therebetween, a train of pallets travelling along said track in endwise contact from the feed end thereof over said wind box assembly to the delivery end, frame members paralleling said track at opposite sides of the machine extending from one end of said wind box assembly, a dead plate at said one end of said wind box assembly, pivot rods mounted on said frame members extending therebetween underlying said dead plate, and weighted levers extending lengthwise of said track independently pivoted on said rods urging said dead plate upward into close proximity to the bottoms of pallets passing thereover providing a substantially airtight closure therefor.

5. In a sintering machine comprising a track having a feed end and a delivery end with a wind box assembly therebetween, a train of pallets travelling along said track in endwise contact from the feed end thereof over said wind box assembly to the delivery end, a dead plate at one end of said wind box assembly, and weighted levers extending lengthwise of said track pivoted on axes extending transversely thereof and underlying said dead plate for their full length, said dead plate resting on said levers and urged upward thereby into close proximity to the bottoms of pallets passing thereover providing a substantially airtight closure therefor.

WILLIAM J. URBAN.

REFERENCES CITED

The following references are of record in the file of this patent:

UNITED STATES PATENTS

| Number | Name | Date |
| --- | --- | --- |
| 1,027,110 | Dwight | May 21, 1912 |
| 1,690,231 | Klugh | Nov. 6, 1928 |
| 2,271,967 | Beers | Feb. 3, 1942 |

FOREIGN PATENTS

| Number | Country | Date |
| --- | --- | --- |
| 677,557 | Germany | June 28, 1939 |